(12) United States Patent
Bezancon et al.

(10) Patent No.: US 9,959,552 B2
(45) Date of Patent: May 1, 2018

(54) SYSTEM AND METHOD FOR DISCOUNTED SALES TRANSACTIONS

(75) Inventors: Anne Bezancon, Oakland, CA (US); Daniel Parkes, San Francisco, CA (US); Blair A. Swedeen, San Francisco, CA (US)

(73) Assignee: 1020, Inc., San Francisco, CA (US)

( * ) Notice: Subject to any disclaimer, the term of this patent is extended or adjusted under 35 U.S.C. 154(b) by 1290 days.

(21) Appl. No.: 13/364,254

(22) Filed: Feb. 1, 2012

(65) Prior Publication Data

US 2012/0197720 A1    Aug. 2, 2012

Related U.S. Application Data

(60) Provisional application No. 61/438,949, filed on Feb. 2, 2011.

(51) Int. Cl.
  *G06Q 30/00*    (2012.01)
  *G06Q 30/02*    (2012.01)

(52) U.S. Cl.
  CPC ..... *G06Q 30/0255* (2013.01); *G06Q 30/0261* (2013.01); *G06Q 30/0269* (2013.01)

(58) Field of Classification Search
  CPC ................................................. G06Q 30/0251
  See application file for complete search history.

(56) References Cited

U.S. PATENT DOCUMENTS

| | | |
|---|---|---|
| 5,740,549 A | 4/1998 | Reilly et al. |
| 5,761,601 A | 6/1998 | Nemirofsky et al. |
| 5,835,061 A | 11/1998 | Stewart |
| 5,915,243 A | 6/1999 | Smolen |
| 5,937,392 A | 8/1999 | Alberts |
| 5,948,040 A | 9/1999 | DeLorme et al. |
| 5,948,061 A | 9/1999 | Merriman et al. |
| 5,969,678 A | 10/1999 | Stewart |
| 6,044,403 A | 3/2000 | Gerszberg et al. |
| 6,108,709 A | 8/2000 | Shinomura et al. |
| 6,119,098 A | 9/2000 | Guyot et al. |
| 6,259,405 B1 | 7/2001 | Stewart et al. |
| 6,326,918 B1 | 10/2001 | Stewart |
| 6,430,500 B1 | 8/2002 | Kubota et al. |
| 6,452,498 B2 | 9/2002 | Stewart |
| 6,456,234 B1 | 9/2002 | Johnson |

(Continued)

OTHER PUBLICATIONS

PCT Search Report and Written Opinion dated May 10, 2012 corresponding to the related U.S. Appl. No. 12/023,591.

(Continued)

*Primary Examiner* — Gurkanwaljit Singh
(74) *Attorney, Agent, or Firm* — DLA Piper LLP (US)

(57) ABSTRACT

A method and system for communicating promotional offers by registering an electronic device with a server, activating a promotional offer stored on the server, receiving location information of the electronic device by the server over a network, determining the electronic device is to receive the promotional offer based upon the received location information, sending the promotional offer from the server to the electronic device over the network, sending a positive response to the promotional offer from the electronic device, over the network, and to the server, and sending a confirmation of the positive response from the server, over the network, and to the electronic device.

44 Claims, 2 Drawing Sheets

(56) References Cited

U.S. PATENT DOCUMENTS

| | | |
|---|---|---|
| 6,487,538 B1 | 11/2002 | Gupta et al. |
| 6,553,310 B1 | 4/2003 | Lopke |
| 6,601,046 B1 | 7/2003 | Epstein |
| 6,697,018 B2 | 2/2004 | Stewart |
| 6,698,020 B1 | 2/2004 | Zigmond et al. |
| 6,759,960 B2 | 7/2004 | Stewart |
| 6,795,700 B2 | 9/2004 | Karaoguz et al. |
| 6,798,358 B2 | 9/2004 | Joyce et al. |
| 6,799,032 B2 | 9/2004 | McDonnell et al. |
| 6,804,657 B1 | 10/2004 | Sultan |
| 6,819,267 B1 | 11/2004 | Edmark et al. |
| 6,832,373 B2 | 12/2004 | O'Neill |
| 6,845,400 B2 | 1/2005 | Mapherson et al. |
| 6,848,542 B2 | 2/2005 | Gailey et al. |
| 6,920,464 B2 | 7/2005 | Fox |
| 6,983,313 B1 | 1/2006 | Korkea-aho |
| 6,990,462 B1 | 1/2006 | Wilcox et al. |
| 7,009,556 B2 | 3/2006 | Stewart |
| 7,039,599 B2 | 5/2006 | Merriman et al. |
| 7,058,594 B2 | 6/2006 | Stewart |
| 7,062,510 B1 | 6/2006 | Eldering |
| 7,150,030 B1 | 12/2006 | Eldering et al. |
| 7,234,942 B2 | 6/2007 | Hu et al. |
| 7,239,871 B2 | 7/2007 | Shamp et al. |
| 7,366,779 B1 | 4/2008 | Crawford |
| 7,366,799 B2 | 4/2008 | Reddy et al. |
| 7,466,986 B2 | 12/2008 | Halcrow et al. |
| 7,532,898 B2 | 5/2009 | Halcrow et al. |
| 7,571,249 B2 | 8/2009 | Wu |
| 7,589,628 B1 | 9/2009 | Brady, Jr. |
| 7,640,009 B2 | 12/2009 | Belkin et al. |
| 7,668,832 B2 | 2/2010 | Yeh et al. |
| 7,680,796 B2 | 3/2010 | Yeh et al. |
| 7,870,025 B2 * | 1/2011 | English .................. 705/14.49 |
| 7,917,153 B2 | 3/2011 | Orwant et al. |
| 2001/0029465 A1 | 6/2001 | Strisower |
| 2002/0036122 A1 | 3/2002 | Fayette et al. |
| 2002/0046232 A1 | 4/2002 | Adams et al. |
| 2002/0052782 A1 * | 5/2002 | Landesmann ................. 705/14 |
| 2002/0198775 A1 * | 12/2002 | Ryan ............................ 705/14 |
| 2003/0006911 A1 | 1/2003 | Smith et al. |
| 2003/0045996 A1 | 3/2003 | Yamazaki et al. |
| 2003/0055723 A1 * | 3/2003 | English .......................... 705/14 |
| 2003/0056218 A1 | 3/2003 | Wingard et al. |
| 2003/0061206 A1 | 3/2003 | Qian |
| 2003/0110171 A1 | 6/2003 | Ozer et al. |
| 2003/0135581 A1 | 7/2003 | Phalen et al. |
| 2003/0177058 A1 | 9/2003 | Needham |
| 2003/0208754 A1 * | 11/2003 | Sridhar et al. .................. 725/34 |
| 2004/0054574 A1 * | 3/2004 | Kaufman et al. ............... 705/14 |
| 2004/0083131 A1 * | 4/2004 | Kaufman et al. ............... 705/14 |
| 2004/0181807 A1 | 9/2004 | Theiste et al. |
| 2004/0203890 A1 | 10/2004 | Karaoguz et al. |
| 2004/0209602 A1 | 10/2004 | Joyce et al. |
| 2004/0259567 A1 | 12/2004 | Valko et al. |
| 2005/0010472 A1 * | 1/2005 | Quatse et al. .................. 705/14 |
| 2005/0038698 A1 | 2/2005 | Lukose et al. |
| 2005/0055374 A1 | 3/2005 | Sato |
| 2005/0086261 A1 | 4/2005 | Mammone |
| 2005/0096978 A1 | 5/2005 | Black |
| 2005/0143094 A1 | 6/2005 | Reed et al. |
| 2005/0222905 A1 | 10/2005 | Wills |
| 2006/0064346 A1 | 3/2006 | Steenstra et al. |
| 2006/0143072 A1 * | 6/2006 | Herman et al. ................. 705/10 |
| 2006/0173841 A1 | 8/2006 | Bill |
| 2006/0201775 A1 * | 9/2006 | Tedesco et al. ............... 194/206 |
| 2006/0248177 A1 | 11/2006 | Dostert et al. |
| 2006/0282316 A1 | 12/2006 | Snyder et al. |
| 2006/0293955 A1 | 12/2006 | Wilson et al. |
| 2007/0015515 A1 | 1/2007 | Huotari et al. |
| 2007/0030824 A1 | 2/2007 | Ribaudo et al. |
| 2007/0050244 A1 | 3/2007 | Stevens |
| 2007/0084917 A1 * | 4/2007 | Fajkowski ................... 235/383 |
| 2007/0088801 A1 | 4/2007 | Levkovitz et al. |
| 2007/0198674 A1 | 8/2007 | Li et al. |
| 2007/0218979 A1 | 9/2007 | Momoda et al. |
| 2007/0244811 A1 | 10/2007 | Tumminaro |
| 2007/0260531 A1 | 11/2007 | Bezancon |
| 2007/0260741 A1 | 11/2007 | Bezancon |
| 2007/0273558 A1 | 11/2007 | Smith et al. |
| 2008/0248815 A1 * | 10/2008 | Busch ........................ 455/456.5 |
| 2008/0262910 A1 * | 10/2008 | Altberg et al. .................. 705/14 |
| 2008/0275759 A1 | 11/2008 | Parkes et al. |
| 2008/0294584 A1 | 11/2008 | Herz |
| 2008/0312817 A1 | 12/2008 | Kawauchi |
| 2008/0313122 A1 * | 12/2008 | Otto et al. ....................... 706/47 |
| 2009/0043644 A1 | 2/2009 | Wilkman |
| 2009/0044246 A1 | 2/2009 | Sheehan et al. |
| 2009/0059874 A1 | 3/2009 | Carter |
| 2009/0063293 A1 | 3/2009 | Mirrashidi et al. |
| 2009/0070216 A1 * | 3/2009 | Silvera et al. .................. 705/14 |
| 2009/0125380 A1 * | 5/2009 | Otto et al. ....................... 705/10 |
| 2009/0125396 A1 * | 5/2009 | Otto et al. ....................... 705/14 |
| 2009/0147778 A1 * | 6/2009 | Wanless et al. ............... 370/389 |
| 2009/0150211 A1 * | 6/2009 | Bayne ............................ 705/10 |
| 2009/0156182 A1 | 6/2009 | Jenkins et al. |
| 2009/0204560 A1 | 8/2009 | Kim |
| 2009/0254971 A1 * | 10/2009 | Herz et al. ....................... 726/1 |
| 2009/0299647 A1 * | 12/2009 | Keeter et al. .............. 705/14.35 |
| 2009/0299857 A1 | 12/2009 | Brubaker |
| 2009/0313109 A1 | 12/2009 | Bous et al. |
| 2010/0138297 A1 * | 6/2010 | Fitzgerald et al. ........ 705/14.53 |
| 2010/0138298 A1 * | 6/2010 | Fitzgerald et al. ........ 705/14.53 |
| 2010/0211450 A1 * | 8/2010 | Landesmann .............. 705/14.25 |
| 2011/0015984 A1 * | 1/2011 | Galinos ..................... 705/14.26 |
| 2011/0302011 A1 * | 12/2011 | Yoder et al. ............... 705/14.17 |
| 2012/0078697 A1 * | 3/2012 | Carlson et al. ............ 705/14.23 |
| 2012/0078699 A1 * | 3/2012 | Carlson et al. ............ 705/14.23 |
| 2012/0095819 A1 * | 4/2012 | Li .............................. 705/14.23 |
| 2012/0150619 A1 * | 6/2012 | Sushil et al. ............... 705/14.39 |
| 2012/0303446 A1 * | 11/2012 | Busch ....................... 705/14.45 |
| 2013/0097006 A1 * | 4/2013 | Evans et al. .............. 705/14.39 |
| 2013/0097080 A1 * | 4/2013 | Smets et al. ................... 705/44 |

OTHER PUBLICATIONS

U.S. Appl. No. 10/886,502, filed Jul. 2004, Bezancon.
U.S. Appl. No. 12/339,582, filed Dec. 2008, Parkes et al.
U.S. Appl. No. 12/339,603, filed Dec. 2008, Parkes et al.
U.S. Appl. No. 12/367,477, filed Feb. 2009, Parkes et al.

* cited by examiner

SYSTEM AND METHOD FOR DISCOUNTED SALES TRANSACTIONS

RELATED APPLICATIONS

This application claims the benefit of U.S. Provisional Application No. 61/438,949, filed Feb. 2, 2011, and which is incorporated herein by reference.

FIELD OF THE INVENTION

The present invention relates to information databases and networks, and more particularly to a system and method for electronically providing discounts to members of a buying group.

BACKGROUND OF THE INVENTION

With the advent of the Internet, wireless networks, and portable electronic devices, there has been an explosion of location-based information that can be disseminated based upon the location of the recipient. Specifically, it is known to automatically detect the proximity of an electronic device such as a cell phone, smartphone or PDA to a particular location, and select electronic content for transmission to that electronic device that has a particular relevancy to that location. For example, a user that is detected to be presently within one mile of a car dealership would be a prime target for an advertising campaign for that dealership, or for the type of cars sold at that dealership. An advertiser could transmit advertising electronic content to that person's portable electronic device once the proximity to the dealership is detected.

Pushing advertisements to electronic devices based solely on their locations, without more, can only provide so much in terms of advertisement effectiveness. There is a need for a more effective system and method for engaging with users of portable electronic devices so that the advertiser can actually receive responses from those users regarding promotions being advertised.

BRIEF SUMMARY OF THE INVENTION

The present invention addresses the above mentioned needs with a method of communicating promotional offers that includes registering an electronic device with a server, activating a promotional offer stored on the server, receiving location information of the electronic device by the server over a network, determining the electronic device is to receive the promotional offer based upon the received location information, sending the promotional offer from the server to the electronic device over the network, sending a positive response to the promotional offer from the electronic device, over the network, and to the server, and sending a confirmation of the positive response from the server, over the network, and to the electronic device.

In another aspect of the present invention, a promotional offer communication system includes a network for communicating with an electronic device and a server. The server is configured to receive registration information for the electronic device, activate a promotional offer stored on the server, receive location information of the electronic device over the network, determine the electronic device is to receive the promotional offer based upon the received location information, send the promotional offer to the electronic device over the network, receive a positive response to the promotional offer from the electronic device over the network, and send a confirmation of the positive response to the electronic device over the network.

Other objects and features of the present invention will become apparent by a review of the specification, claims and appended figures.

DETAILED DESCRIPTION OF THE INVENTION

Figure 1:
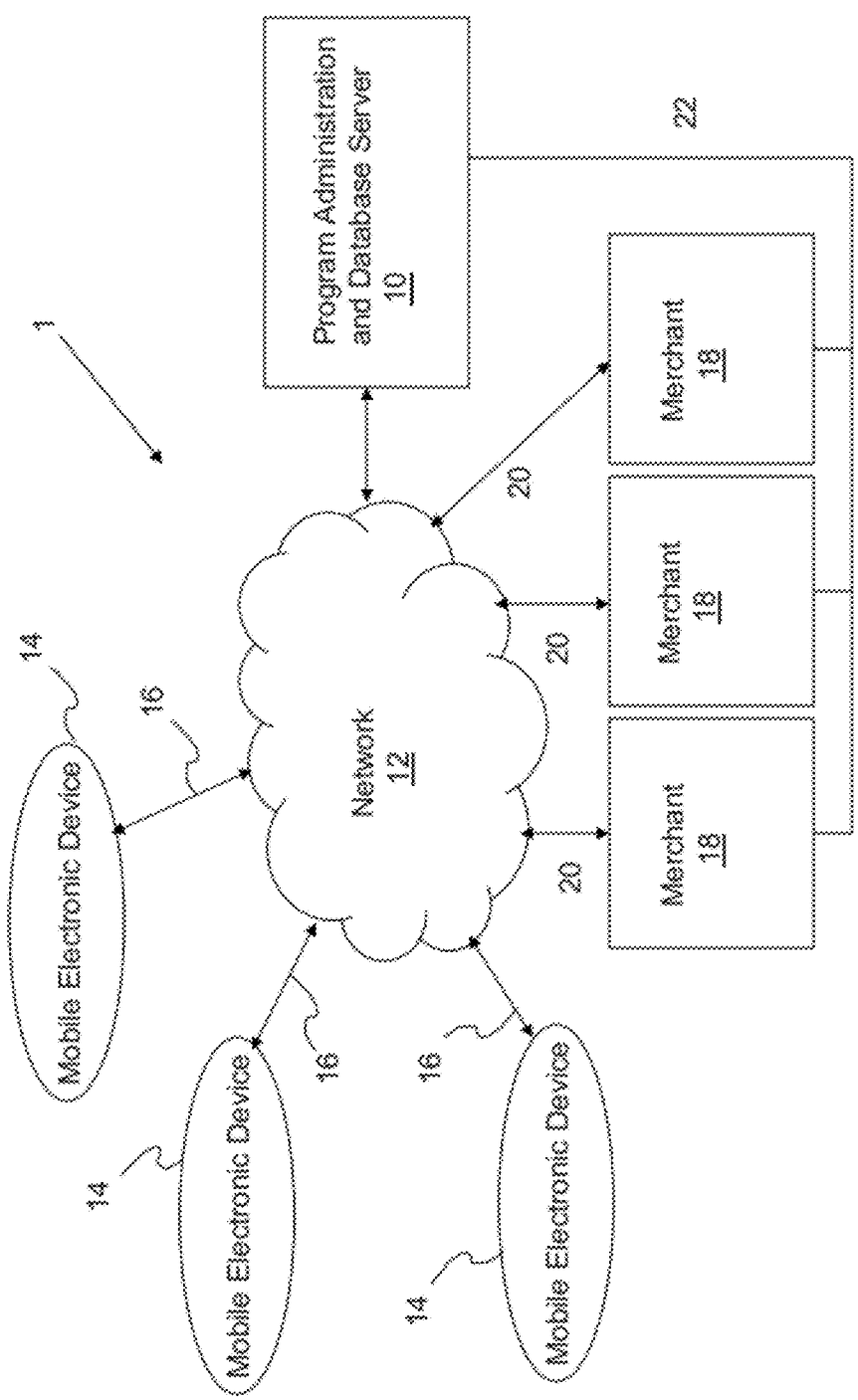
FIG. 1 is a diagram illustrating the electronic promotion distribution system of the present invention.

The present invention is a system and method for implementing a program that provides discounts to members of a buying group. The invention is implemented using the system illustrated in FIG. 1. The system 1 includes a program administration and database server 10 connected to a network 12. Server 10 can be a single computing device or a plurality of interconnected computing device co-located and/or remotely located from each other that store and process information. A plurality of user mobile electronic devices 14 communicate to the program administration and database server 10 via network 12 and connections 16 to the network 12. Merchants 18 communicate with the program administration and database server 10 via connections 20 to network 12 and/or by separate connection 22.

Mobile electronic devices 14 can be cell phones, PDA's, laptop computers, tablet computers, or any other type of mobile electronic device capable of communicating with a network. The network 12 can be one or more point to point connections, a single network (e.g. the Internet), one or more cellular networks, nested networks and/or multiple interconnected or separate networks. Network 12 (and/or portions thereof) can be wired and/or wireless. Network 12 can utilize different components thereof for roundtrip communications (e.g. utilize a local WiFi network and the Internet to send a communication from a mobile device 14 to server 10, and utilize a 3G cellular network to send a responsive communication from the server 10 to the mobile device 14).

The electronic devices 14 and/or the network 12 are configured to automatically or upon request convey information about the locations of the electronic devices 14 to program administration and database server 10. There are several techniques for automatically determining the location of any given electronic device 14. For example, the electronic device 14 can include an internal GPS system, which determines the location of electronic device 14 from a network of GPS satellites. The determined location of electronic device 14 is communicated to the server 10 via connection 16 and network 12. Alternately, the electronic device 14 is connected to the network 12 via a connection 16 which utilizes a network access point having a known location (e.g. a WiFi hotspot inside a business of known location). When the electronic device 14 connects to the network 12 via connection 16 that utilizes the network access point of known location, that location is then communicated to database server 10 via network 12. Alternately, electronic device 14 could be connected to the network 12 via a connection 16 that is part of a cellular communications system having a plurality of cell towers. The cell tower system (and/or an external network communicating with the cell tower system) can determine approximate location of the electronic device 14 actively (by triggering interactions with cell tower(s) of known locations—e.g. triangulation) or passively (by retrieving information about recent tower interactions), and send that location to database server 10 via network 12. Electronic device 14 could also include an input device (i.e. keyboard, touchscreen, etc.) that allows the user to input location information, which is then communicated to server 10 via connection 16 and network 12.

Users of the mobile electronic devices 14 register with the program administered by server 10, by providing contact information (name, address, e-mail address, etc.), purchasing information (e.g. credit card, debit card, automatic account withdrawal, billing account address, etc.), and electronic device identification (e.g. cell phone number). When they register, users agree to voluntarily share their location with the program administration and database server 10 (i.e. they agree to let the system monitor the location of their electronic device 14). When users register, or anytime thereafter, they can create a profile of preferences for the types of promotions they want to receive, the categories of products or services they are interested in, and the trigger criteria for receiving those offers (e.g. dining offers between 6 pm and 7 pm on weekdays only).

Merchants 18 provide to the server 10 flash sales offers, which are promotions offering discounted products and services. For each offer, a "geofence" is created for the merchant or offer, which is a measure of proximity to the merchant or point of interest (e.g. within 1 mile of a location, within same city of a location, within same county of a location, within same zip code of a location, within same telephone area code as a location, etc.). When a user enters the geofence or is within the geofence when the offer is published (i.e. when the user comes within or is within a predetermined proximity to the merchant or point of interest) at the time or within the time period for which the promotion is taking place, a flash sales alert is sent by server 10 to the user's mobile electronic device 14. For example, a restaurant could activate a flash sates alert for anyone nearby offering a 50% discount on dinner if the user shows up with a coupon in the next 30 minutes, and the user has 5 minutes to accept the offer by replying "yes". The user then has the option of responding positively to the offer. If they do (i.e. sending a positive reply according to the terms of the offer), then the server 10 sends the user a coupon, code, and/or any other information needed to redeem the flash sales offer. The user then can go to the merchant location or point of interest, provide the coupon or code (i.e. displayed on the screen of the electronic device), and receive the product or service.

Figure 2A:
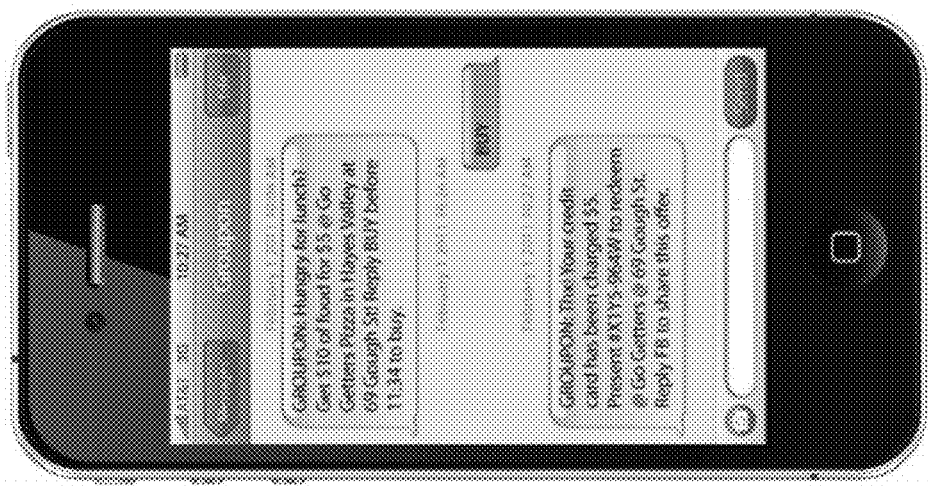
FIG. 2A is a front view of a user's mobile device indicating a merchant offer.
Figure 2B:
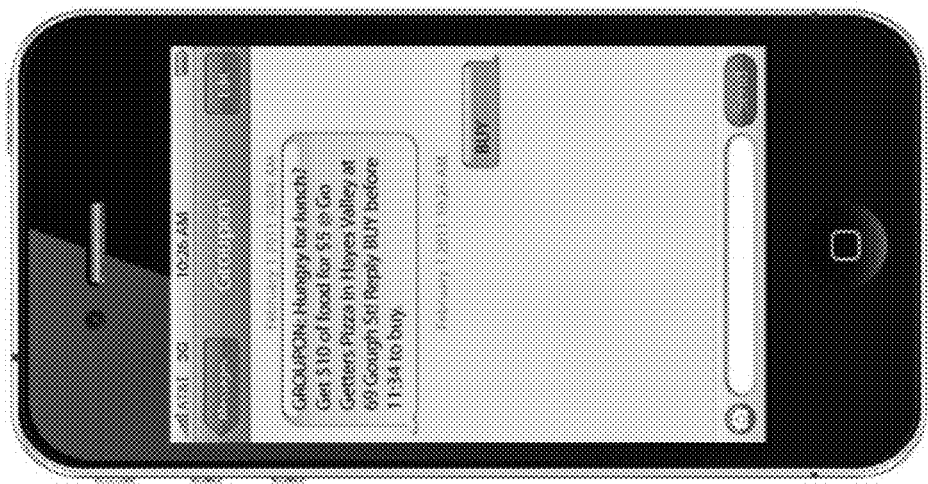
FIG. 2B is a front view of a user's mobile device indicating a confirmation of acceptance of the merchant offer.

The positive confirmation by the user provides the merchant with the real time confirmation that the offer has been accepted (i.e. they can expect the user to show up soon), and possibly cease further flash sales offers if enough acceptances are received. The positive confirmation could also be used to consummate the offer (i.e. the presentation of the coupon), or could be used to consummate sales transaction without the user being physically present. An example of a consummated sales transaction would be where a merchant provides nearby shoppers an offer to buy a certain product at a reduced sales price, whereby acceptance of the offer by the user using their electronic device 14 authorizes the merchant to charge the user using the purchasing information provided during the program registration). The sale is completed electronically, whereby the user picks up their product at their convenience anytime later. FIGS. 2A and 2B illustrate the consummated sales transaction. FIG. 2A illustrates the flash sales alert on the user's device, along with an option to buy the offered goods/services. FIG. 2B illustrates the confirmation from the merchant after the user accepts by activating the "buy" button, confirming that the sale has been consummated (i.e. the user's credit card has been charged and the merchant notice has been received indicating the redemption code and instructions how to redeem the purchased goods/services).

The present invention provides merchants the ability to dynamically control temporary sales offers to nearby shoppers. For example, a restaurant unusually quiet can issue flash sales offers to bring in immediate traffic, and cease those offers the moment the restaurant gas sufficiently busy. Moreover, the offer can be binding on the user, meaning that accepting the sales offer using the electronic device authorizes the merchant to complete the sales transaction electronically (i.e. before the user comes to pick up the product or enjoy the service). Thus, a merchant can offer a discount on a product of limited supply, knowing that it can be retracted the moment supplies are exhausted, yet without risk of being left with excess inventory because the product sales transactions were completed and finalized using the electronic devices before the users physically enter the store. Merchants preferably can provide and retract flash sales offers in real time using a direct interface with program administration and database server 10.

There are permutations and other features of the present invention. For example, the Program Administration and Database server 10 can be configured to automatically, or by request, share the accepted offer by the user with others. For example, after an offer acceptance, the user can be asked if the accepted offer should be shared with other program registrants or associates of the user on social media services such as Twitter and Facebook. This would add interest in the merchant, possibly enticing others to the merchant.

The merchant offer could be contingent on a certain number of acceptances and/or finalized transactions within a prescribed period. For example, the offer could provide that it can only be redeemed if a certain number of other program participants accept the offer or finalize the purchase. Otherwise, the offer is rescinded, or any finalized transactions are reversed.

The promotional offers can be constrained by time, quantity and/or place. An example of time constraint is an offer that is presented to all those present within the geofence at a particular time (i.e. 4 pm), or all those present in or entering the geofence within a given time range (4 pm to 4:15 pm). An advantage of a short time constraint is that the server 10 need only monitor presence within the geofence once or only within a small window of time. The time constraint can apply to the time of the offer and/or the time of the redemption. An example of a quantity constraint is an offer that says it is only valid to the first 10 people who send a positive response, or that the value of the offered discount depends upon the number of acceptances (e.g. 10% discount if less than 10 people accept, or 15% discount if 10 or more people accept). An example of a place constraint is an offer good all day long (or an extended time period) for anyone in or entering the geofence. Because this would require constant monitoring of location, an application could be downloaded to the user's electronic device to use its GPS system to provide location as opposed to relying on network capabilities such as triangulation which could be onerous and expensive. An example of a combination of constraints would be an offer where cumulative conditions apply (there is an offer for this location at this time in the category requested, and the user has registered, and the user is within the geofence at the time of the flash sale offer (independent of whether there are any time constraints on when the user has to physically redeem the product or service)).

The invention is applicable to perishable and non-perishable products or services. A perishable product is one that is transitory in that it has value for only a short time, like an open table at a restaurant, or an open seat in a theater, A non-perishable product is one that is not transitory, such as a case of soda or other consumer product which has a value in the coming days that won't change.

The value of the offered discount can depend upon time (i.e. increase or decrease with time). For example, the discount could be 20% if accepted in the next 5 minutes, 15% if accepted in the next 20 minutes and 10% if accepted in the next 30 minutes.

The user preferences can be constrained by time, quantity and/or place. An example of time preference is the user's availability to receive offers only within a given day range or a combination of day and time range, or only before or after a given date or given time. An advantage of a time constraint is that the server 10 need only monitor presence within the geofence at the times set by the user. Another advantage is that the user can segment the available times according to their own schedule. An example of a quantitative preference is the user's willingness to receive only offers that provide more than a certain percentage discount on the price of a product or service or a certain minimum quantity of products or services, or offers that are only made available to more or to less than a given number of people, or offers that have already been bought by a given number of people or a certain percentage of the total required for the offer to be honored by the merchant. An example of a place preference is the user's selection of certain geographies or certain specific locations or venues from which to receive offers. An example of a combination of preferences would be when a user would only receive an offer where cumulative conditions apply (there is an offer for this user-selected location in this user-selected time period in the category requested).

Further criteria can be considered in determining whether an electronic device meeting the location proximity threshold or criteria should receive the promotional offer. For example, past purchases may be considered in determining if the electronic device should receive the promotional offer. In addition or alternatively, past acceptances or rejections of previous promotional offers can be considered in deciding whether or not the electronic device should receive the promotional offer.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims. Further, as is apparent from the claims and specification, not all method steps need be performed in the exact order illustrated or claimed, but rather in any order that allows the proper dissemination and response to promotional offers.

Hardware, software and/or firmware can be used to implement the logic steps and/or processes of the invention. It should further be appreciated that such logic steps or process can be implemented as computer-executable instructions stored on a non-transitory computer readable medium, such a CD or DVD (including re-writable CDs and DVDs), flash or other non-volatile memory, ROM, EEPROM, disc drive, solid state drive, etc.

What is claimed is:

1. A method of communicating promotional offers, comprising:
    registering an electronic device with a server;
    activating a promotional offer stored on the server;
    receiving location information of the electronic device by the server over a network;
    determining the electronic device is to receive the promotional offer based upon the received location information;
    sending the promotional offer from the server to the electronic device over the network;
    sending a positive response accepting the promotional offer from the electronic device, over the network, and to the server;
    sending a confirmation of the positive response accepting the promotional offer from the server, over the network, and to the electronic device; and
    wherein the confirmation of the positive response includes a confirmation of completed sales transaction.

2. The method of claim 1, wherein the registering comprises providing profile information of a user of the electronic device to the server, and wherein the determining comprises:
    determining that the promotional offer matches the profile information, and
    determining that the electronic device is located within a predetermined distance from a location associated with the promotional offer.

3. The method of claim 2, wherein the profile information comprises at least one of promotional offers of interest, categories of products or services of interest, and trigger criteria for receiving offers.

4. The method of claim 1, wherein the determining comprises:
    determining that the electronic device is located within a predetermined distance from a location associated with the promotional offer.

5. The method of claim 1, wherein the determining comprises:
    determining that the electronic device is located within a predetermined distance from a location associated with the promotional offer and within a time period associated with the promotional offer.

6. The method of claim 1, wherein the determining comprises:
    determining that the electronic device has entered a geofence associated with the promotional offer.

7. The method of claim 1, wherein the determining comprises:
    determining that the electronic device is located within a geofence associated with the promotional offer.

8. The method of claim 1, wherein the determining comprises:
    determining that the electronic device has entered a geofence associated with the promotional offer at a particular time.

9. The method of claim 1, wherein the determining comprises:
    determining that the electronic device is located within a geofence associated with the promotional offer at a particular time.

10. The method of claim 1, wherein the determining further comprises:

determining that a number of previously received positive responses to the promotional offer is above or below a predetermined number.

11. The method of claim 1, wherein the determining is further based upon at least one of a past purchase involving the electronic device and a past positive response to a prior promotional offer involving the electronic device.

12. The method of claim 1, wherein the promotional offer is associated with a predetermined time period, and wherein the confirmation of the positive response includes a confirmation of an acceptance of the positive response if the sending of the positive response occurs within the predetermined time period, or a confirmation of a declination of the positive response if the sending of the positive response occurs outside of the predetermined time period.

13. The method of claim 1, wherein the promotional offer is associated with a predetermined acceptance number, and wherein the confirmation of the positive response includes a confirmation of an acceptance of the positive response based upon a number of previous acceptances of the promotional offer being less than the predetermined acceptance number, or a confirmation of a declination of the positive response based upon a number of previous acceptances of the promotional offer being more than the predetermined acceptance number.

14. The method of claim 1, wherein the promotional offer is associated with a predetermined acceptance number, and wherein the confirmation of the positive response includes a confirmation of an acceptance of the positive response based upon a number of previous acceptances of the promotional offer being more than the predetermined acceptance number, or a confirmation of a declination of the positive response based upon a number of previous acceptances of the promotional offer being less than the predetermined acceptance number.

15. The method of claim 1, wherein the promotional offer is associated with a predetermined acceptance number, and wherein the sending of the confirmation comprises:
sending a confirmation of an acceptance of the positive response to the electronic device based upon a number of previous acceptances of the promotional offer being less than the predetermined acceptance number, or
sending a confirmation of declination of the positive response to the electronic device based upon a number of previous acceptances of the promotional offer being more than the predetermined acceptance number.

16. The method of claim 1, wherein the confirmation of the positive response includes at least one of a coupon, a code and redemption information.

17. The method of claim 1, further comprising:
sending a message to at least one other electronic device announcing the positive response to the promotional offer.

18. The method of claim 1, further comprising:
sending a message to at least one other electronic device announcing the confirmation of the acceptance of the positive response to the promotional offer.

19. The method of claim 1, wherein the receiving comprises receiving the location information of the electronic device from the electronic device over the network.

20. The method of claim 1, wherein promotional offer sent from the server to the electronic device is in the form of an SMS text.

21. The method of claim 20, wherein the positive response sent from the electronic device to the server is in the form of an SMS text.

22. The method of claim 21, wherein the confirmation sent from the server to the electronic device is in the form of an SMS text.

23. A promotional offer communication system, comprising:
a network for communicating with an electronic device; and
a server configured to:
receive registration information for the electronic device; activate a promotional offer stored on the server;
receive location information of the electronic device over the network;
determine the electronic device is to receive the promotional offer based upon the received location information;
send the promotional offer to the electronic device over the network;
receive a positive response accepting the promotional offer from the electronic device over the network;
send a confirmation of the positive response accepting the promotional offer to the electronic device over the network; and
wherein the confirmation of the positive response includes a confirmation of completed sales transaction.

24. The system of claim 23, wherein the registration information includes profile information of a user of the electronic device to the server, and wherein the server configuration for determining the electronic device is to receive the promotional offer further comprises:
determine that the promotional offer matches the profile information, and
determine that the electronic device is located within a predetermined distance from a location associated with the promotional offer.

25. The system of claim 24, wherein the profile information comprises at least one of promotional offers of interest, categories of products or services of interest, and trigger criteria for receiving offers.

26. The system of claim 23, wherein the server configuration for determining the electronic device is to receive the promotional offer further comprises:
determine that the electronic device is located within a predetermined distance from a location associated with the promotional offer.

27. The system of claim 23, wherein the server configuration for determining the electronic device is to receive the promotional offer further comprises:
determine that the electronic device is located within a predetermined distance from a location associated with the promotional offer and within a time period associated with the promotional offer.

28. The system of claim 23, wherein the server configuration for determining the electronic device is to receive the promotional offer further comprises:
determine that the electronic device has entered a geofence associated with the promotional offer.

29. The system of claim 23, wherein the server configuration for determining the electronic device is to receive the promotional offer further comprises:
determine that the electronic device is located within a geofence associated with the promotional offer.

30. The system of claim 23, wherein the server configuration for determining the electronic device is to receive the promotional offer further comprises:

determine that the electronic device has entered a geofence associated with the promotional offer at a particular time.

31. The system of claim 23, wherein the server configuration for determining the electronic device is to receive the promotional offer further comprises:
determine that the electronic device is located within a geofence associated with the promotional offer at a particular time.

32. The system of claim 23, wherein the server configuration for determining the electronic device is to receive the promotional offer further comprises:
determine that a number of previously received positive responses to the promotional offer is above or below a predetermined number.

33. The system of claim 23, wherein the server configuration for determining the electronic device is to receive the promotional offer further comprises:
determine the electronic device is to receive the promotional offer based upon the received location information and based upon at least one of a past purchase involving the electronic device and a past positive response to a prior promotional offer involving the electronic device.

34. The system of claim 23, wherein the promotional offer is associated with a predetermined time period, and wherein the confirmation of the positive response includes a confirmation of an acceptance of the positive response if the receiving of the positive response occurs within the predetermined time period, or a confirmation of a declination of the positive response if the receiving of the positive response occurs outside of the predetermined time period.

35. The system of claim 23, wherein the promotional offer is associated with a predetermined acceptance number, and wherein the confirmation of the positive response includes a confirmation of an acceptance of the positive response based upon a number of previous acceptances of the promotional offer being less than the predetermined acceptance number, or a confirmation of a declination of the positive response based upon a number of previous acceptances of the promotional offer being more than the predetermined acceptance number.

36. The system of claim 23, wherein the promotional offer is associated with a predetermined acceptance number, and wherein the confirmation of the positive response includes a confirmation of an acceptance of the positive response based upon a number of previous acceptances of the promotional offer being more than the predetermined acceptance number, or a confirmation of a declination of the positive response based upon a number of previous acceptances of the promotional offer being less than the predetermined acceptance number.

37. The system of claim 23, wherein the promotional offer is associated with a predetermined acceptance number, and wherein the sending of the confirmation comprises:
sending a confirmation of an acceptance of the positive response to the electronic device based upon a number of previous acceptances of the promotional offer being less than the predetermined acceptance number, or
sending a confirmation of declination of the positive response to the electronic device based upon a number of previous acceptances of the promotional offer being more than the predetermined acceptance number.

38. The system of claim 23, wherein the confirmation of the positive response includes at least one of a coupon, a code and redemption information.

39. The system of claim 23, wherein the server is further configured to send a message to at least one other electronic device announcing the positive response to the promotional offer.

40. The system of claim 23, wherein the server is further configured to send a message to at least one other electronic device announcing the confirmation of the acceptance of the positive response to the promotional offer.

41. The system of claim 23, wherein the server configuration for receiving the location information further comprises receiving the location information of the electronic device from the electronic device over the network.

42. The system of claim 23, wherein promotional offer sent from the server to the electronic device is in the form of an SMS text.

43. The system of claim 42, wherein the positive response sent from the electronic device to the server is in the form of an SMS text.

44. The system of claim 43, wherein the confirmation sent from the server to the electronic device is in the form of an SMS text.

* * * * *